Dec. 19, 1950   E. C. THOMSON   2,534,323
ELECTRONIC CONTROL APPARATUS
Filed Aug. 20, 1943
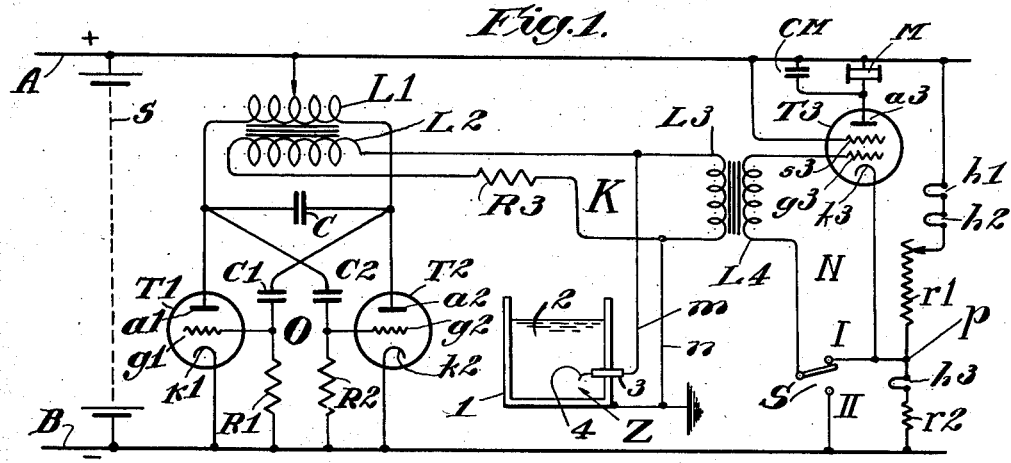
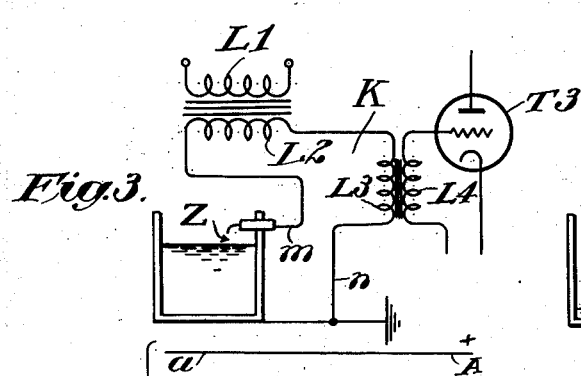
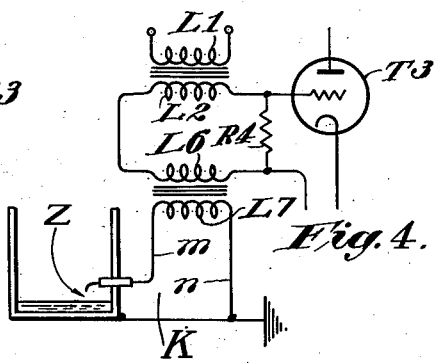
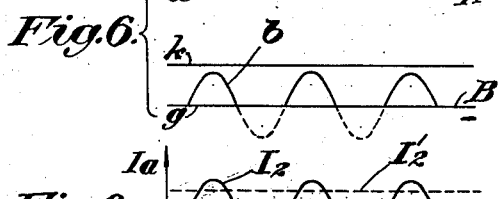
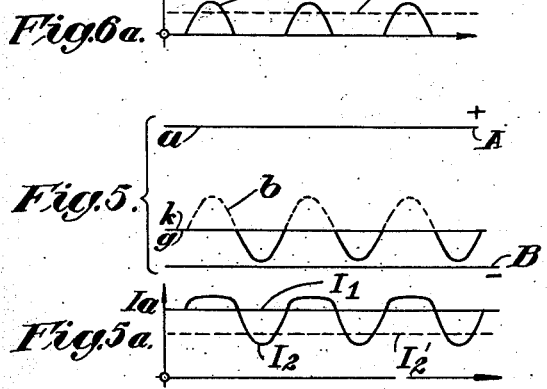
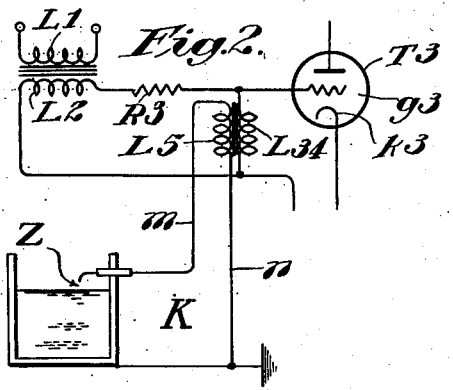
Inventor
E. Craig Thomson.
by
Attorney Patented Dec. 19, 1950

2,534,323

UNITED STATES PATENT OFFICE 2,534,323

ELECTRONIC CONTROL APPARATUS

E. Craig Thomson, Boston, Mass., assignor to Photoswitch, Incorporated, Cambridge, Mass., a corporation of Massachusetts Application August 20, 1943, Serial No. 499,397

10 Claims. (Cl. 250—27)

This invention relates to electronic relay apparatus and especially to circuits which actuate a controlling device in response to changing operating conditions which affect the magnitude of a detecting impedance, as for example the resistance of material between testing probes, or the fluid or air between a container and a liquid level detecting probe.

Some of the objects of the present invention are to provide an arrangement of this type which is especially suited for supervision of conductive materials under conditions where only direct current is available whereas the nature of the material necessitates the use of bidirectional current in circuits including that material, in order to avoid electrolytic effects, to provide a device of this type the probe element of which is electrically isolated, and generally to provide an electronic impedance detecting circuit which is sensitive and accurate, and yet simple, rugged and reliable.

In an especially important aspect, the invention provides a device which permits the detection of liquid levels under conditions where the potential levels of both the positive and negative sides of the direct current line are above the potential level of the vessel or storage tank which is to be used as a ground terminal. Such conditions are, for example, met with on shipboard when it is desired to supervise the water level in a boiler without the use of floats or other mechanical means requiring cumbersome apparatus.

These and other objects and aspects will be more fully apparent from the following description of several practical embodiments illustrating the genus of the invention. The description refers to drawings in which Fig. 1 is the circuit diagram of a liquid level control arrangement incorporating the invention;

Figs. 2 to 4 are similar diagrams showing modifications of the controlling circuit according to Fig. 1; and Figs. 5, 5a, 6 and 6a are diagrams illustrating the operation of circuits according to Figs. 1 to 4.

In the arrangement according to Fig. 1, a source of unidirectional current of any suitable type, for example a battery S, supplies direct current terminals A, B. A source of bidirectional current derives energy from direct current supply wires A and B and feeds into a load impedance L1 constituting an alternating current supply source.

An oscillator O of the multivibrator type was found to be quite suitable as a means for supplying bidirectional current; such an oscillator may be connected to the direct current source as follows. The cathodes $k1$ and $k2$ of triodes T1 and T2 (which may be joined as double triode in a single vessel) are connected to terminal B, and the anodes $a1$, $a2$ are connected to the terminals of supply inductance L1, for example the primary of a transformer L1, L2, a midpoint tap supply inductance L1 being connected to supply terminal A. Grid $g1$ is connected to one side of a condenser C1, the other side of which is connected to anode $a2$, and grid $g2$ is connected to one side of condenser C2, the other side of which is connected to anode $a1$. Resistors R1 and R2 are connected between the other direct current supply terminal B and grids $g1$ and $g2$, respectively. A condenser C is preferably connected across inductance L1 or L2.

A control circuit N includes a triode T3 which is connected to direct current supply terminals A and B as follows. The cathode $k3$ is joined to a tap $p$ of a potential apportioning circuit which includes resistors $r1$ and $r2$ which may be adjustable and which may include the heaters $h1$, $h2$, $h3$ of triodes T1, T2 and T3. The grid $g3$ of triode T3 is connected to one terminal of a control impedance L4, for example the secondary of a transformer L3, L4, the other terminal of which impedance may be joined either to tap $p$ or directly to supply terminal B. This alternative is indicated in Fig. 1 by switch S with contacts I and II, representing any suitable connecting device. A current responsive device, as for example a relay magnet M shunted by a sustaining condenser CM, is connected between anode $a3$ of triode T3 and supply terminal A. It will be understood that the output energy of triode T3 may actuate any desirable controlled device, depending on the conditions at hand.

A controlling circuit K links oscillator O and control circuit N as follows. The supply impedance is inclined in circuit K for example by connecting secondary L2 in series with a resistor R3 and primary L3 of transformer L3, L4. Circuit K also includes the variable detecting impedance Z which is in this particular embodiment connected in parallel to inductances L2 in series with R3, and L3. This detecting impedance may for example consist of the material between probe terminals $m$ and $n$ associated with a tank 1 containing fluid or other material 2. Terminal $m$ may be introduced into the fluid 2 by means of an insulator 3 and a probe 4, whereas terminal $n$ may be connected to tank 1 and to ground.

The detecting impedance may be arranged in the controlling circuit in various ways insuring a change of potential distribution in that circuit when the value of the detecting impedance changes. Such possibilities are indicated in Figs. 2 to 4.

The controlling circuit of Fig. 2 is quite similar to that of Fig. 1, with the difference that a single coil L34 replaces transformer L3, L4, the detecting impedance Z being connected to the controlling circuit in parallel with L2 and L34 by means of a coil L5 magnetically coupled to L34.

In Fig. 3, the controlling circuit, instead of including a detecting impedance connected in parallel to the inductances L2 and L3, includes this detecting impedance in series with these inductances.

In Fig. 4, the detecting impedance probe is coupled to an intermediate impedance connected in series in the controlling circuit, which intermediate impedance is represented by inductance L6 magnetically coupled to inductance L7 in series with the detecting impedance Z. As likewise shown in Fig. 4, a resistance R4 may be used for coupling the controlling circuit K to the control circuit N.

The arrangement according to Fig. 1 operates as follows.

During the warming-up period both tubes T1 and T2 are conducting. Any tendency of one tube, for example T1, momentarily to become more conducting than the other will cause that other tube T2 to become momentarily less conducting due to the coupling through condenser C2. This effect will continue until grid $g2$ is driven sufficiently negative with respect to its cathode $k2$ to cause tube T2 to become completely nonconducting. There will be no further change until the charge has leaked off condenser C2 and tube T2 again starts to conduct. Tube T1 will then gradually swing into a nonconducting state due to coupling through condenser C1. Current will pass alternately through each half of the primary L1, thus inducing an alternating current in the secondary L2.

The frequency of oscillation is primarily determined by the time-constant of the condensers C1 and C2 and resistors R1 and R2. Condenser C is introduced further to stabilize the frequency by tuning either primary L1 or secondary L2 or both to that frequency, the secondary supplying with the aid of this arrangement an essentially sinusoidal wave.

Referring now to the operation of the supervising circuit proper, it may be initially assumed that the detecting impedance Z between points $m$ and $n$ is very low, for example due to the fact that probe 4 is immersed in well conducting liquid 2 filling tank 1, and it may be further assumed that connector S is in position I.

Under these conditions, the alternating current energy supplied by transformer L1, L2 is consumed mainly in circuit L2—Z—R3, transformer L3, L4 is practically without current, and cathode $k3$ as well as grid $g3$ are, due to resistance $r2$, $h2$ at a potential level somewhat above that of direct current terminal B, as indicated by lines $k$, $g$ and $a$ of Fig. 5. Tube T3 is under these conditions conductive, energizing relay magnet M which, for example, may operate a signaling device indicating that tank 1 is properly filled. This situation is indicated in Fig. 5a, where $I_1$ indicates the plate current under the above conditions.

If now the level of liquid 2 falls below probe 4, impedance Z increases, the alternating current flow in controlling circuit K decreases, the voltage drop across resistance R3 decreases, and the voltage across inductances L3 and L4 increases. The alternating voltage across L4 is superimposed on the potential level $k$, $g$, as indicated at $b$ of Fig. 5. Hence, grid $g3$ is driven negative during half of each cycle, so that the plate current assumes the configuration $I_2$ (Fig. 5a), the flattened positive half cycles being due to the fact that an increasingly positive grid potential, indicated by dotting of curve $b$ in Fig. 5, does not appreciably affect the conductivity of the tube. The average plate current under these conditions is $I_2'$ which is of lower value than $I_1$. Provided that the alternating voltage $b$, superimposed on the grid potential, is sufficient for this purpose (which condition is easily obtainable by well-known appropriate selection of the circuit elements involved), the plate current $I_2'$ of tube T3 becomes too low for energizing magnet M sufficiently to hold its armature, so that appropriate apparatus will be caused to react to the sinking of the level below probe 4.

Assuming now that connector S is in position II and that the liquid level is above probe 4, the grid and cathode potentials will be at different levels as indicated at $k$ and $g$ of Fig. 6; tube T3 is nonconductive and magnet M deenergized under these conditions. If impedance Z increases, due to sinking of the liquid level below probe 4, alternating voltage $b$ of L4 is superimposed upon the grid potential. This causes tube T3 to become conductive during the positive half cycles of $b$ when the grid potential is raised, as indicated at $I_2$ of Fig. 6a. The average plate current $I_2^1$ is sufficient to energize relay magnet M, which is used to actuate appropriate apparatus in response to the falling of the liquid level below the probe. If probe 4 is mounted at the desired highest level of the material in tank 1, the relay will be energized during normal condition but deenergized when the material rises above the probe.

It will thus be seen that the arrangement according to the invention can be very easily adapted to varying conditions of operation, with the controlled element, such as a relay magnet, being either energized or deenergized when the detecting impedance is either high or low.

The circuit according to Fig. 2 is quite similar to that of Fig. 1, with the difference that a single coil L34 replaces primary and secondary L3, L4, respectively, whereas the detecting impedance Z is applied in parallel through the medium of coil L5 coupled to L34. With impedance Z high, as shown in the drawing, very little current flows in L34 and the current responsive element M is deenergized if connection I is used, or energized if connection II is used. When Z decreases for example due to rising of the liquid level in the tank, the current in L34 increases due to shunting through Z, and M is deenergized or energized respectively.

With the impedance connected in series in the controlling circuit, as shown in Figs. 3 and 4, impedance L4 or R4, respectively, will not carry appreciable current and hence not affect the potential level of grid $g3$ when the detecting impedance is high as shown in these figures. With connection I, an arrangement according to Fig. 3 will deenergize magnet M when the liquid level reaches probe 4; in an arrangement according to Fig. 4, magnet M is kept deenergized so long as the liquid level is above probe 4. With connection II, tube T3 becomes more conductive, and M energized when the liquid level reaches the probe (Fig. 3) or is above the probe (Fig. 4), respectively.

Referring especially to Fig. 4, the series operation of this circuit will be easier understood by observing that the impedance of L6 is low when detecting impedance Z is low, that is when probe 4 is immersed; this condition permits flow of appreciable current in circuit L2—R4—L6, causing voltage drop across R4 and superimposing alternating voltage b on grid g3. If the fluid falls below probe 4, increasing Z, the impedance of the system L6, L7 also increases, the current in R4 becomes smaller and hence also the alternating voltage b. Depending on the use of connection I or II, T3 thereupon becomes more or less conductive, respectively, according to the effect described with reference to Figs. 5 to 6a.

It will now be evident that the control circuit K which includes the detecting impedance Z is electrically isolated from all other circuit elements, so that the tank I can be grounded regardless of the potential levels of the supply terminals.

It should be understood that the present disclosure is for the purpose of illustration only and that this invention includes all modifications and equivalents which fall within the scope of the appended claims.

I claim:

1. In electric relay apparatus of the type described, a source of unidirectional current; means for supplying bidirectional current, including a supply impedance; a discharge device having anode, cathode and control electrode; an output circuit including said source, said anode and cathode, and current-responsive means for actuating a controlled device; a control circuit including a control impedance connecting the low potential side of said source to said control electrode; a variable detecting impedance; and a controlling circuit including in series connection said supply impedance and said control impedance, said variable detecting impedance being connected in parallel to said control impedance; variation of said detecting impedance varying the potential distribution in said control impedance and hence the condition of said actuating means.

2. In electric relay apparatus of the type described, a source of unidirectional current; means for supplying bidirectional current, including a supply inductance; a discharge device having anode, cathode and control electrode; an output circuit including said source, said anode and cathode, and current-responsive means for actuating a controlled device; a control circuit including a control inductance connected between the low potential side of said source and the control electrode of said discharge device; a variable detecting impedance; and a controlling circuit including a first inductance coupled to said supply inductance, in series thereto a second inductance coupled to said control inductance, said detecting impedance being connected in parallel to said second inductance; variation of said detecting impedance varying the potential distribution in said control inductance and hence the condition of said actuating means.

3. In an electric relay circuit of the type described, a source of unidirectional current; means for supplying bidirectional current and including a supply inductance; a discharge device having cathode, anode and auxiliary electrode; an output circuit including said source, said anode and cathode, and current-responsive means for actuating a controlled device; a control circuit including a control inductance connected between the low potential side of said source and said control electrode; a variable detecting impedance; and a controlling circuit, electrically isolated from said supply inductance, in series thereto a second inductance coupled to said control inductance, and said variable detecting impedance in series to said first and second inductances; variation of said detecting impedance varying the potential distribution in said control inductance, and hence the condition of said actuating means.

4. In electric relay apparatus of the type described, a source of direct current; an oscillator circuit energized by said source; a transformer, the primary of which is connected to the output of said oscillator; a discharge device having an anode, cathode, and control electrode; an output circuit including said source, said anode and cathode, and current-responsive means for actuating a controlled device; a second transformer; a connection, including the secondary of said second transformer, from the low potential side of said source to said electrode; a controlling circuit including, in series connection, the secondary of said first transformer and the primary of said second transformer; and a detecting impedance connected in parallel with the primary of said second transformer, variation of said detecting impedance altering the current through the primary of said second transformer and hence the condition of said actuating means.

5. In electric relay apparatus of the type described, a source of direct current; an oscillator circuit energized by said source; a transformer, the primary of which is connected to the output of said oscillator; a discharge device having an anode, cathode, and control electrode; an output circuit including said source, said anode and cathode, and current-responsive means for actuating a controlled device; a second transformer; a connection, including the secondary of said second transformer, from the low potential side of said source to said electrode; a controlling circuit including, in series connection, the secondaries of said first and second transformers; a detecting impedance; and a circuit comprising, in series connection, said detecting impedance and the primary of said second transformer, whereby variation of said detecting impedance may alter the condition of said actuating means.

6. An electronic relay comprising: a source of direct current; a discharge device having an anode, cathode and control electrode; an output circuit including said source, said anode and cathode, and current-responsive means for actuating a controlled device; a control transformer, having a primary and a secondary; a biasing network for said control electrode, including said secondary and adapted to alter the potential of said electrode in proportion to changes in voltage across said secondary; a variable detecting impedance; a detecting circuit, electrically isolated from said output circuit, and including said primary directly connected to said detecting impedance; and means for supplying alternating current to said detecting circuit while maintaining its isolation.

7. Apparatus according to claim 6 in which said cathode is connected directly to the low potential side of said source.

8. Apparatus according to claim 6 in which said biasing network includes a resistance connected between said cathode and the low potential side of said source.

9. Apparatus according to claim 6 in which said alternating current is supplied through an output transformer by an oscillator energized by said direct current source.

10. An electronic relay comprising: a source of direct current; a discharge device having an anode, cathode and control electrode; an output circuit including said source, said anode and cathode, and current-responsive means for actuating a controlled device; a control transformer, having a primary and a secondary, said secondary being connected as a biasing impedance between said cathode and control electrode; a variable detecting impedance; a detecting circuit, electrically isolated from said output circuit, and including said primary directly connected to said detecting impedance; and means for supplying alternating current to said detecting circuit while maintaining its isolation.

E. CRAIG THOMSON.

REFERENCES CITED

The following references are of record in the file of this patent:

UNITED STATES PATENTS

| Number | Name | Date |
| --- | --- | --- |
| 2,011,381 | Suits | Aug. 13, 1935 |
| 2,042,490 | Zahl | June 2, 1936 |
| 2,112,682 | Ryder | Mar. 29, 1938 |
| 2,113,376 | Janco | Apr. 5, 1938 |
| 2,213,961 | Hunter | Sept. 10, 1940 |
| 2,237,254 | Broekhuysen | Apr. 1, 1941 |
| 2,306,237 | Wolfner, 2d | Dec. 22, 1942 |
| 2,316,875 | Laboulais | Apr. 20, 1943 |
| 2,349,849 | Deal | May 30, 1944 |
| 2,358,452 | Wolfner, 2d | Sept. 19, 1944 |
| 2,358,433 | Wolfner, 2d | Sept. 19, 1944 |
| 2,369,678 | McWhirter | Feb. 20, 1945 |
| 2,400,908 | Birss | May 28, 1946 |

FOREIGN PATENTS

| Number | Country | Date |
| --- | --- | --- |
| 385,265 | Great Britain | Jan. 1933 |